United States Patent
Chang

(10) Patent No.: US 11,263,376 B1
(45) Date of Patent: Mar. 1, 2022

(54) SYSTEM AND METHOD FOR FIXING UNKNOWNS WHEN SIMULATING NESTED CLOCK GATERS

(71) Applicant: Avery Design Systems, Inc., Tewksbury, MA (US)

(72) Inventor: Kai-Hui Chang, Andover, MA (US)

(73) Assignee: Avery Design Systems, Inc., Tewksbury, MA (US)

( * ) Notice: Subject to any disclaimer, the term of this patent is extended or adjusted under 35 U.S.C. 154(b) by 0 days.

(21) Appl. No.: 16/909,963

(22) Filed: Jun. 23, 2020

Related U.S. Application Data

(60) Provisional application No. 63/006,799, filed on Apr. 8, 2020.

(51) Int. Cl.
   *G06F 30/3323* (2020.01)
   *G06F 119/16* (2020.01)
   *H03K 3/012* (2006.01)
   *H03K 3/037* (2006.01)
   *H03K 19/20* (2006.01)

(52) U.S. Cl.
   CPC ......... *G06F 30/3323* (2020.01); *H03K 3/012* (2013.01); *H03K 3/037* (2013.01); *G06F 2119/16* (2020.01); *H03K 19/20* (2013.01)

(58) Field of Classification Search
   USPC ........................................... 716/108
   See application file for complete search history.

(56) References Cited

U.S. PATENT DOCUMENTS

| | | | |
|---|---|---|---|
| 7,082,582 B1 * | 7/2006 | Borkovic | G06F 30/327 716/103 |
| 8,402,405 B1 | 3/2013 | Chang | |
| 9,058,452 B1 * | 6/2015 | Chang | G06F 30/33 |
| 10,666,255 B1 | 5/2020 | Chang | |

\* cited by examiner

*Primary Examiner* — Bryce M Aisaka
(74) *Attorney, Agent, or Firm* — Loginov & Associates, PLLC; William A. Loginov

(57) ABSTRACT

A computer executable tool fixes gate-level logic simulation when unknowns (Xs) exist in nested clock gater chains to improve simulation accuracy. Due to X-pessimism in logic simulation, false Xs are generated when simulating nested clock gaters, producing incorrect simulation results. The tool analyzes the fan-in cones along a nested clock gater chain to find such false Xs. Furthermore, it generates auxiliary code to be used with logic simulation to eliminate such false Xs. Gate-level simulation can then be repaired to produce correct results for nested clock gaters.

17 Claims, 8 Drawing Sheets

```
always @(g1.o or g2.o or reg1.q)
if (g1.o === 1'b1 && g2.o === 1'b1 && reg1.q === 1'bx)
    force g6.o = 1'b0;
else
    release g6.o;
```

FIG. 2

```
always @(posedge CG2.CK)
if (OR.o == 1'bx && i1 == 1'b0)
    force CG2.GCK = 1'b0;
else
    release CG2.GCK;
```

FIG. 6

SYSTEM AND METHOD FOR FIXING UNKNOWNS WHEN SIMULATING NESTED CLOCK GATERS

RELATED APPLICATIONS

This application claims the benefit of U.S. Provisional Application Ser. No. 63/006,799, filed Apr. 8, 2020, entitled SYSTEM AND METHOD FOR FIXING UNKNOWNS WHEN SIMULATING NESTED CLOCK GATERS, the entire disclosure of which is herein incorporated by reference.

FIELD OF THE INVENTION

The present application relates generally to integrated circuit design and, most particularly, to techniques for correcting logic simulation results when unknowns (Xs) exist.

BACKGROUND OF THE INVENTION

The present application is an extension to the inventor's prior work, "System and Method for Correcting Gate-level Simulation Accuracy when Unknowns", U.S. Pat. No. 8,402,405, which is incorporated herein by reference in its entirety. In the prior work, a method for identifying false Xs and generating fixes was disclosed, and a methodology to correct gate-level simulation was proposed.

In the prior work, the system and method to identify false Xs work as follows. The input to the method is a sequential element data input, d, that has X in logic simulation. A sequential element can be a flip-flop, a latch or a memory, etc. The method returns true if the X is false; otherwise, false is returned. The fan-in cone circuit is also returned in subckt. This is achieved using the following steps.

(1) Trace the fan-in cone of d along the variables whose logic simulation values are Xs. Add all the gates along the trace to subckt. Stop when the variable is a primary input of the design or an output of a register.

(2) Build a Boolean function from subckt. The output of the function is d, and the inputs are the primary inputs of subckt. For each input, check its logic simulation value. If the value is not X, propagate the non-X value through the input to simplify the Boolean function. If the value is X, the input remains an input to the simplified Boolean function.

(3) Use a Boolean solver to check whether the output is constant. If the output is constant, return true. Otherwise, return false. subckt is also returned. True means a false X is found.

After false X is identified, our prior work minimizes the X-eliminating sub-circuit to generate a compact fix to eliminate the false X. The input to the method is subckt, and the output is a new subckt that is a subset of the original one and still eliminates false Xs. The first minimization is called function ckt_minimize1 in our prior work and works as follows.

(1) Move the output of subckt to one of the inputs of its fan-in gate that has X in logic simulation. A new sub-circuit, subckt$_n$, will be formed.

(2) Use the false-X identification algorithm described earlier to prove whether subckt$_n$ produces a false X and its output is still a constant. If it is no longer a constant, discard the change. Otherwise, replace subckt with subckt$_n$. Repeat steps (1) and (2) until no further changes can be made.

At this point, the primary output of subckt, called cpo, is a variable whose X is false that is farthest from the output of the original subckt. Function ckt_minimize2 in our prior work then performs the following steps that reduces subckt from its inputs, and it is summarized below. Note that we use terminology "fanin frontier" to represent a collection of wires in the netlist that form a cut while the logic on the fanout side of the cut still generates a false X.

(1) Remove each gate that connects to the primary inputs of subckt, one at a time, to form a new sub-circuit called subckt$_n$. The output of the gate becomes a potential new fanin frontier variable.

(2) Check if cpo is still constant using subckt$_n$. If it is no longer constant, discard the change. Otherwise, replace subckt with subckt$_n$. Repeat steps (1) and (2) until no further changes can be made.

At this point, subckt is a subset of the original subckt whose inputs are real Xs and whose output is a false X. Since removing any single gate will produce a real X again, this sub-circuit is a minimal one that can eliminate the X.

In addition to the above circuit minimization method, our prior work, "System and Method for Compacting X-pessimism Fixes for Gate-level Logic Simulation," U.S. patent Ser. No. 10/666,255, which is incorporated herein by reference in its entirety, can also be used to optimize the original sub-circuit to produce a minimized one.

The sub-circuit (subckt) produced using one of the above methods can be used to generate auxiliary code to repair gate-level logic simulation, and the steps to do so are as follows.

(1) Traverse the inputs (fanin frontier) of subckt to generate the condition for the false X to occur based on its logic simulation value. For example, if variable var1 is 1 and var2 is X in logic simulation, the condition is "var1===1'b1 && var2===1'bx".

(2) Generate code to replace the X with the known constant value when the condition matches. The constant value can be derived by assigning random non-X values to the inputs of subckt and checking its output. When the condition does not match, the generated code should disable such value over-write. In the Verilog and SystemVerilog Hardware Design Language, "force" and "release" can be used.

An example to repair the X-pessimism problem in FIG. 1 is shown in FIG. 2. The generated code can fix all false Xs that match the condition.

Our prior work identifies and eliminates false Xs in combinational logic. In the present application we extend our prior work to handle false Xs created by clock gaters. A clock gater is a special type of sequential element containing a latch and a small number of AND/OR gates, and its purpose is to control the clocks to one or more FFs or memories, etc. A clock gater typically has one clock input, one enable input, one or more optional scan-control inputs, and one gated-clock output. When the clock gater enable signal is 1 (true), the gated-clock output toggles with the input clock. When the clock gater enable signal is 0 (false), the output does not toggle with the input clock signal and remains the same value. An example of clock gater is shown in FIG. 3. By disabling clocks to FFs or memories that do not need to latch new values, power consumption of a circuit can be reduced.

Our prior work analyzes combinational fan-in cones at data inputs of sequential elements to find and fix false Xs in combinational logic. However, it cannot find and fix false Xs created by nested clock gaters. An example of a false X from nested clock gaters is shown in FIG. 4. The top of the figure shows logic simulation results when input i2 to the OR gate is X. In this example, the Xs at the EN (enable) signals for clock gaters CG1 and CG2 are both real. As a result, our prior work does not detect any false X and nothing is fixed. This will create a 0 to X transition at the output of CG2, which also creates the same 0 to X transition at the clock pin CK of FF1. Because the value of FF1 is 1 but its data input D is 0 at that time, the 0 to X clock transition is going to cause the output Q of FF1 to go to X because logic simulation pessimistically assumes that its value is no longer known.

Further analysis shows that the X at the output of FF1 is false. The bottom of FIG. 4 explains why. In the figure, we case split the X into its possible two values, 0 and 1, using notation "0/1". As the analysis shows, if the X is 0, it turns off CG1. Then even though the EN of CG2 is 1, the output of CG2 is still 0 because CK of CG2 will not toggle. If the X is 1, then EN of CG1 is 1, and output of CG1 goes to 1. However, because EN of CG2 is 0, output of CG2 stays 0 even though the CK of CG2 toggles. Because in both cases the output of CG2 remains 0, CK of FF1 also remains 0. As a result, output of FF1 should not change and should remain 1. This shows that the X at the output of FF1 in logic simulation is false.

The above example shows that even though the enable signal of each clock gater is a real X, the combined Boolean function can create false Xs at clock gater outputs. In the present application we propose a new system and method to solve this problem.

SUMMARY OF THE INVENTION

This invention analyzes combinational circuits at the fanin cones of enable signals of a chain of nested clock gaters and identifies false Xs produced at clock gater outputs. The incorrect false X values are replaced with correct values, and a fix is generated to fix the false X for subsequent logic simulations when the same false-X generating condition is encountered.

An aspect of the disclosure provides a method of identifying and fixing false Xs created by nested clock gaters, comprising: monitoring at least one clock pin of at least one sequential element in a circuit design; for a chain of nested clock gaters identified at an identified clock path, traversing the identified clock path to find at least one new clock gater on the identified clock path; upon finding the new clock gater on the identified clock path, replacing the new clock gater with a first AND gate wherein a first input of the first AND gate is an original enable signal and a second input of the first AND gate is from a second AND gate that replaces a second clock gater; ceasing traversing the identified clock path; and generating a combinatorial circuit.

In one example, the at least one sequential element in the circuit design comprises one or more of a flip-flop, a memory, or a macro.

In one example, the at least one sequential element comprises all sequential elements except clock gater latches in the circuit design.

In one example, the identified clock path starts from a clock driver that is at least one of: a flip flop output or a signal in a testbench.

In one example, ceasing traversing the identified clock path comprises traversing the identified clock path until all clock gaters on the identified clock path are traversed.

In one example, if the combinatorial circuit is constant, then a false X is found.

In one example, the method further includes identifying a subcircuit responsible for the false X; and inspecting an output of the subcircuit.

In one example, if the output of the subcircuit is an output of the first AND gate, identifying a nested clock gater false X.

In one example, the method further includes generating a fix having a sensitivity list corresponding to a clock signal corresponding to a clock gater input associated with the first AND gate.

In one example, the method further includes forcing the output of the clock-gater corresponding to the first AND gate.

In one example, the second AND gate output controls a clock pin of the first AND gate.

In one example, the chain of nested clock gaters comprises the new clock gater, the second clock gater, and at least one additional clock gater.

In one example, the method further includes replacing the at least one additional clock gater with a third AND gate.

In one example, the at least one additional clock gater is upstream or downstream relative to the new clock gater.

In one example, the second clock gater is upstream or downstream relative to the new clock gater.

Another aspect of the disclosure provides a system, comprising: a memory having program instructions stored thereon; and a processor configured to monitor at least one clock pin of at least one sequential element in a circuit design; for a chain of nested clock gaters identified at an identified clock path, traverse the identified clock path to find at least one new clock gater on the identified clock path; upon finding the new clock gater on the identified clock path, replace the new clock gater with an AND gate where a first input of the AND gate is an original enable signal and a second input of the AND gate is from a second AND gate that replaces a second clock gater; cease traversing the identified clock path; and generate a combinatorial circuit.

Another aspect of the disclosure provides at least one non-transitory computer readable medium storing instructions that, when executed by one or more processors, cause the one or more processors to: monitor at least one clock pin of at least one sequential element in a circuit design; for a chain of nested clock gaters identified at an identified clock path, traverse the identified clock path to find at least one new clock gater on the identified clock path; upon finding the new clock gater on the identified clock path, replace the new clock gater with an AND gate where a first input of the AND gate is an original enable signal and a second input of the AND gate is from a second AND gate that replaces a second clock gater; cease traversing the identified clock path; and generate a combinatorial circuit.

BRIEF DESCRIPTION OF THE DRAWINGS

For a more complete understanding of the invention, reference should be made to the following detailed description and accompanying drawing figures, in which like reference numerals identify like elements in the figures, and in which:

FIG. 2 depicts example code generated by our prior invention (U.S. Pat. No. 8,402,405) to fix the X-pessimism problem in FIG. 1. The output port of a combinational gate is named o", and the output of a register is named q".

FIG. 6 depicts example code generated to fix the X-pessimism problem in FIG. 4.

DETAILED DESCRIPTION

The system and method proposed in this invention identifies and fixes false Xs created by nested clock gaters. This is achieved by the following steps. Note that in the following we assume the clock gaters are for positive-edge triggered sequential elements. Steps for negative-edge triggered elements are similar except that the fix should use negative edge of the clock to trigger, and the force value for the fix should be 1 instead of 0 to block the clock from toggling.

First, monitor the clock pins of all sequential elements (flip-flops, memories, macros, etc.) except clock gater latches in a circuit design. If a clock pin goes to X, trace this clock path to find clock gaters. Then for a chain of nested clock gaters found at a clock path, do the following.

(1) Traverse the clock path to find all clock gaters on the path. The clock path typically starts from a clock driver that is a FF output or a signal in the testbench.

(2) When a new clock gater is reached, get the combinational fanin cone of the enable signal and create a new combinational circuit by ANDing the logic cone of the enable signal with the existing circuit output. This basically replaces the clock gater with an AND gate where one input of the AND gate is the original enable signal, and the other input is from the AND gate that replaced the clock gater whose output controls the clock pin of the current clock gater. Note that for the first clock gater whose clock input comes from FFs or testbench and is not gated by any clock gater, the replacement AND gate will have only one input which is the enable signal, and the "AND" gate essentially becomes a BUFFER gate.

Figure 1:
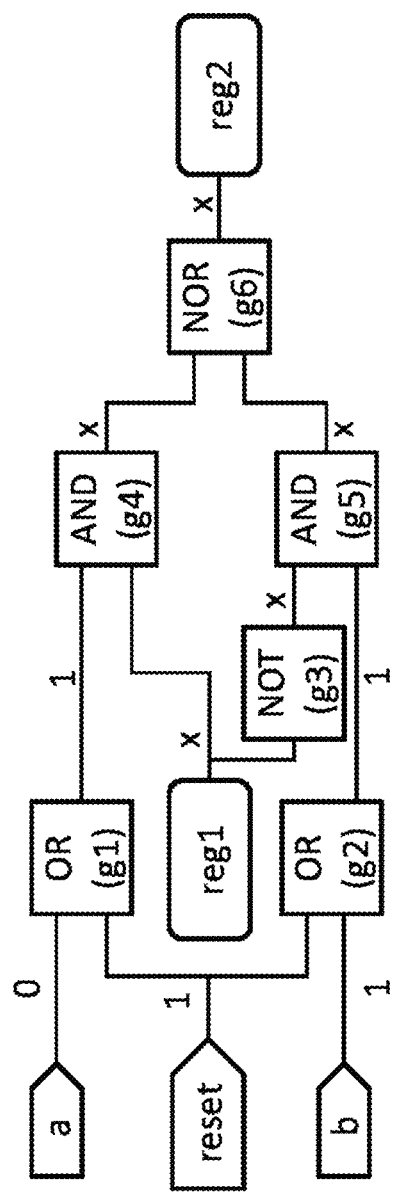
FIG. 1 depicts an example of X-pessimism. The output of g6 should be 0 but logic simulation incorrectly produces X.
Figure 3:
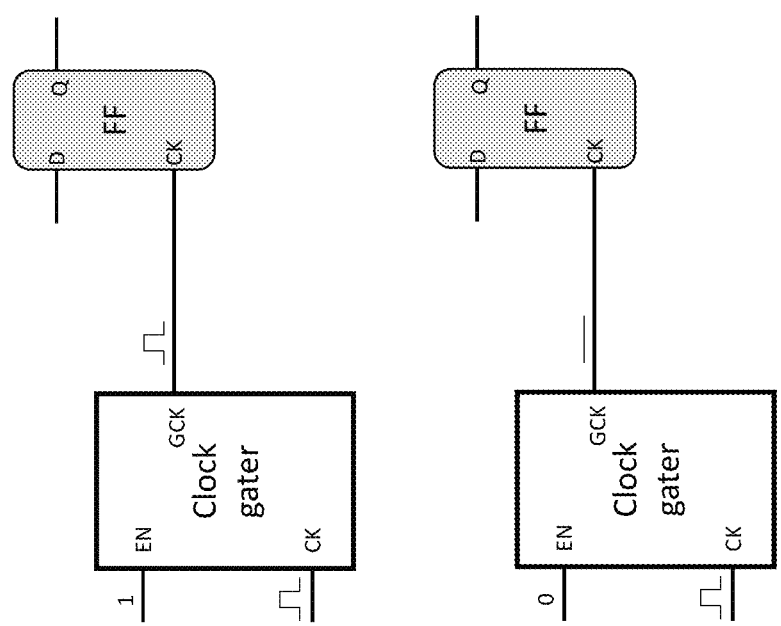
FIG. 3 depicts a clock gater cell and how the enable signal controls the clock gater output.
Figure 4:
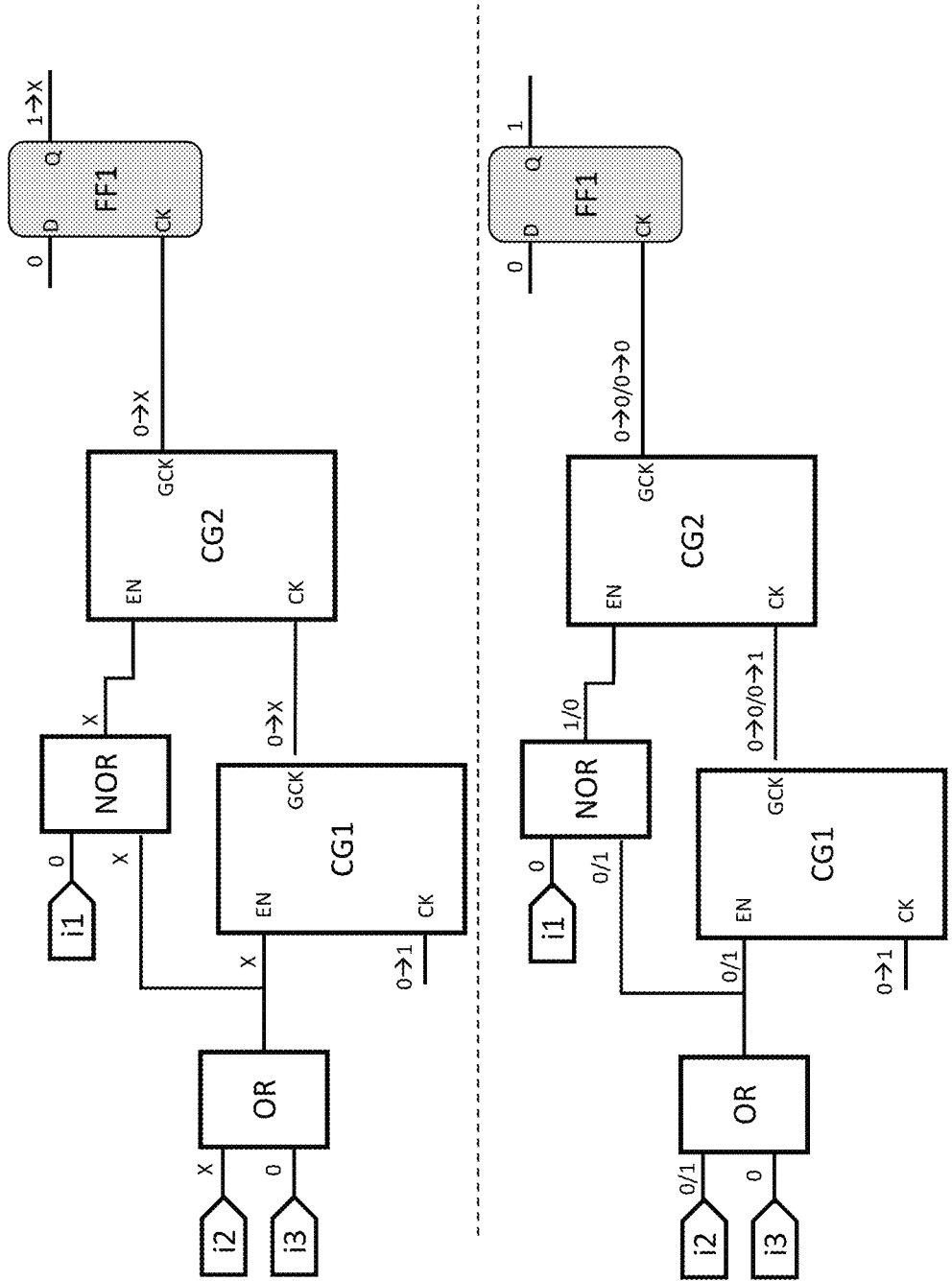
FIG. 4 depicts an example of false Xs generated by nested clock gaters. The top of the figure shows how logic simulation corrupts output Q of FF1 to X. The bottom of the figure shows further analysis that no matter the X is 0 or 1, the output of CG2 will not toggle, and output Q of FF1 should remain 1.
Figure 5:
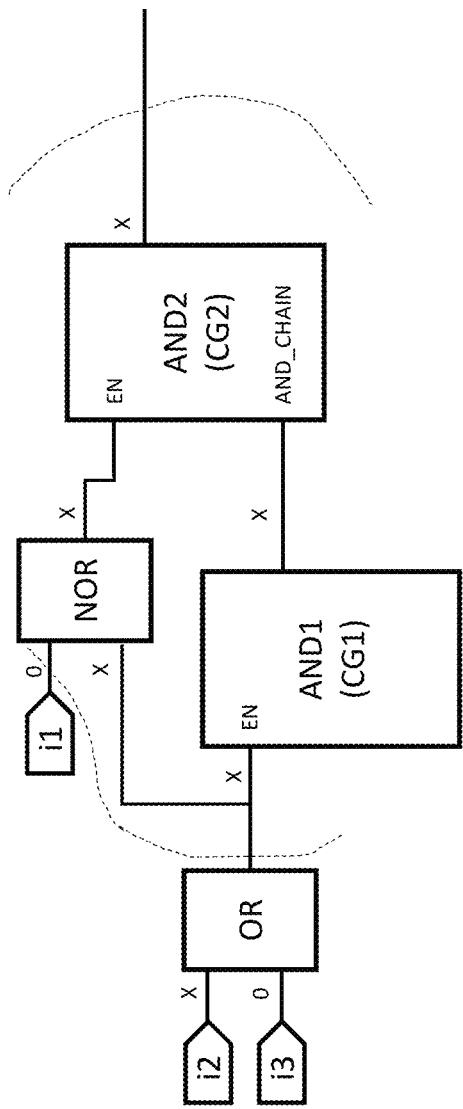
FIG. 5 depicts the combinational circuit created from the example in FIG. 4 for false X analysis.

(3) Repeat the above until all clock gaters on the clock path are traversed. The pseudo code for the above three steps are provided below as function "convert_cg" for clarity. The input to the function is a clock gater cg, and the output is the built combinational circuit that converts clock gaters into AND gates for false X analysis. The function should be called using the first clock gater on a clock path, and the function then recursively calls itself to convert the chain of nested clock gaters to a combinational circuit. In the pseudo code, cg.clock is the clock pin of clock gater cg, and cg.enable is the combinational circuit feeding into the enable pin of the clock gater.

function circuit convert_cg(input cg);
if (cg.clock is not gated) begin
   return cg.enable;
end else begin
   cg2=clock gater controlling cg.clock;
   return AND(cg.enable, convert_cg(cg2));
end After the above steps, a combinational circuit will be produced. An example combinational circuit generated from the circuit in FIG. 4 is shown in FIG. 5. The system and method described in our prior work (U.S. Pat. No. 8,402,405) is then applied to check if the output of the combinational circuit is constant or not. If it is not constant, then the X is real, and nothing needs to be done. If the output of the combinational circuit is constant, then a false X is found.

If a false X is found, the next step is to find a small subcircuit responsible for the false X. This is also achieved using our prior work (U.S. Pat. No. 8,402,405 or U.S. patent Ser. No. 10/666,255). In the example presented in FIG. 5, the minimized subcircuit is shown using dotted lines.

After a minimized subcircuit is found, the output of the subcircuit is inspected. If the output wire is not a clock-gater induced AND output, the fix is not nested clock gater related, and a combinational logic fix is generated using the methods described in our prior work (U.S. Pat. No. 8,402,405). If the output wire is an output of a clock-gater induced AND gate, a nested clock gater false X is found, and a fix should be constructed using the following steps.

(1) The sensitivity list of the fix should be the clock signal corresponding to the clock gater input associated with the AND gate. For example, if the AND gate is added when clock gater CG2 is encountered, then the input clock of CG2 should be the sensitivity list. Furthermore, only the active clock edge should be sensed. Given that there is a false X at this signal, the transition should be 0 to X in logic simulation when the false X appears.

(2) The signals at the inputs of the subcircuit, similar to the fix in our prior work, still becomes the if condition to determine whether a false X is found and a signal should be forced. If the condition matches, the output of the clock gater associated with the AND gate should be forced. Because the condition for a clock gater output to toggle is derived from consecutively ANDing the enable conditions of all previous gaters in the clock path, if a false X exists, the force value must be 0 which prevents the clock gater output from toggling. And then if the condition no longer matches, the force target should be released.

An example of the generated fix is provided in FIG. 6. After a fix is generated, it is applied to the current simulation to fix the X-pessimism issue. The fix can also be used in further logic simulation to fix the same false X.

Figure 7:
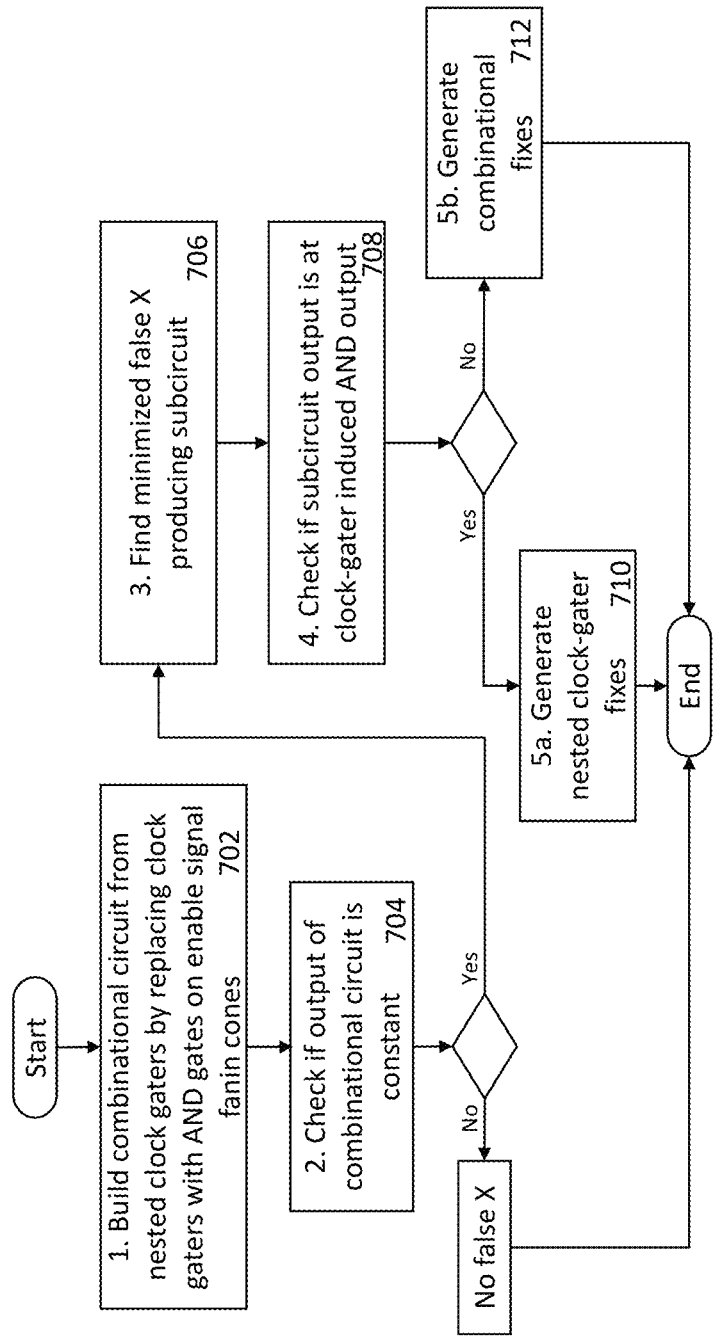
FIG. 7 depicts the flow to find and fix false Xs generated by nested clock gaters.

The steps to analyze an X on a clock pin to find and fix false Xs produced by nested clock gaters are summarized in the flow chart shown in FIG. 7. In 702 a combinational circuit is built from nested clock gaters by replacing clock gaters with AND gates using function "convert_cg" described above. In 704 the combinational circuit is checked to see if its output is constant or not. If constant, in 706 a minimized false X producing subcircuit is produced using our prior art. Then in 708 the subcircuit output is checked to see if it is at a clock-gater induced AND output or not. If it is, in 710 we generate nested clock-gater fixes. If the output is not at a clock-gater induced AND output, in 712 we use our prior art to generate combinational fixes.

Figure 8:
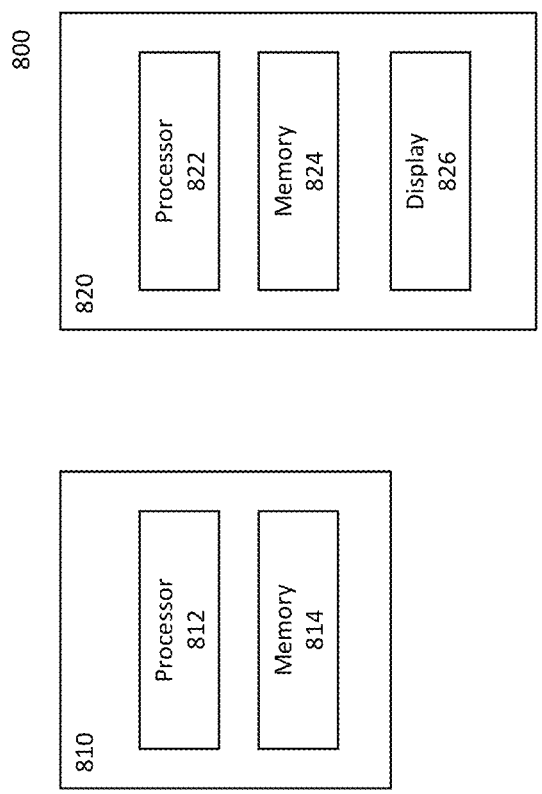
FIG. 8 is a block diagram of a system 800 for implementing the processes and/or subprocesses described in this invention.

FIG. 8 is a block diagram of a system 800 for implementing the processes and/or subprocesses described above according to aspects of the disclosure. As shown, the system 800 may include a computing device 810 and a client computing device 820.

The computing device 810 may include at least one processor 812, at least one memory 814, and any other components typically present in general purpose computers. The memory 814 may store information accessible by the processor 812, such as instructions that may be executed by the processor or data that may be retrieved, manipulated, or stored by the processor. The memory 814 and/or processor 812 can be programmed to carry out a set of logical or arithmetic operations. In one example, the logical or arithmetic operations may be stored on a non-transitory computer readable medium. The processor obtains information from memories, performs logical or arithmetic operations based on programmed instructions, and stores the results of the operations into memories. Although FIG. 8 illustrates processor 812 and memory 814 as being within the same block, it is understood that the processor 812 and memory 814 may respectively comprise one or more processors and/or memories that may or may not be stored in the same physical housing. In one example, computer 810 may be a server that communicates with one or more client devices 820, directly or indirectly, via a network (not shown). The computing device 810 can interact with users through input and output devices (not shown), such as keyboards, mouses, disks, networks, displays and printers.

The client computing device 820 may be configured similarly to the computer 810, such that it may include processor 822, a memory 824, and any other components typically present in a general purpose computer. The client device 820 may be any type of computing device, such as a personal computer, tablet, mobile phone, laptop, PDA, etc. In this example, the client device 820 may also include a display 826, such as an LCD, plasma, touch screen, or the like.

The computer executable processing component described in the present disclosure can be executed by the processor(s) of one or more computing devices, such as computing device 810 and/or client computing device 820, or any other computing device.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while one fix example is shown for illustrative purpose, any design netlist can be employed in accordance with the teachings herein. Additionally, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A method of identifying and fixing false Xs, defined as incorrect unknown values in logic simulation results, created by nested clock gaters, comprising:
    monitoring at least one clock pin of at least one sequential element in a circuit design;
    for a chain of nested clock gaters identified at an identified clock path, traversing the identified clock path to find at least one new clock gater on the identified clock path;
    upon finding the new clock gater on the identified clock path, replacing the new clock gater with a first AND gate wherein a first input of the first AND gate is an original enable signal and a second input of the first AND gate is from a second AND gate that replaces a second clock gater;
    ceasing traversing the identified clock path; and
    generating a combinatorial circuit.

2. The method of claim 1, wherein the at least one sequential element in the circuit design comprises one or more of a flip-flop, a memory, or a macro.

3. The method of claim 1, wherein the at least one sequential element comprises all sequential elements except clock gater latches in the circuit design.

4. The method of claim 1, wherein the identified clock path starts from a clock driver that is at least one of: a flip flop output or a signal in a testbench.

5. The method of claim 1, wherein ceasing traversing the identified clock path comprises traversing the identified clock path until all clock gaters on the identified clock path are traversed.

6. The method of claim 1, wherein if the combinatorial circuit is constant, then a false X is found.

7. The method of claim 6, further comprising:
    identifying a subcircuit responsible for the false X; and
    inspecting an output of the subcircuit.

8. The method of claim 7, wherein, if the output of the subcircuit is an output of the first AND gate, identifying a nested clock gater false X.

9. The method of claim 8, further comprising generating a fix having a sensitivity list corresponding to a clock signal corresponding to a clock gater input associated with the first AND gate.

10. The method of claim 9, further comprising forcing the output of the clock-gater corresponding to the first AND gate.

11. The method of claim 1, wherein the second AND gate output controls a clock pin of the first AND gate.

12. The method of claim 1, wherein the chain of nested clock gaters comprises the new clock gater, the second clock gater, and at least one additional clock gater.

13. The method of claim 12, further comprising replacing the at least one additional clock gater with a third AND gate.

14. The method of claim 12, wherein the at least one additional clock gater is upstream or downstream relative to the new clock gater.

15. The method of claim 1, wherein the second clock gater is upstream or downstream relative to the new clock gater.

16. A system, comprising:
    a memory having program instructions stored thereon; and
    a processor configured to:
        monitor at least one clock pin of at least one sequential element in a circuit design;
        for a chain of nested clock gaters identified at an identified clock path, traverse the identified clock path to find at least one new clock gater on the identified clock path;

upon finding the new clock gater on the identified clock path, replace the new clock gater with an AND gate where a first input of the AND gate is an original enable signal and a second input of the AND gate is from a second AND gate that replaces a second clock gater;

cease traversing the identified clock path; and generate a combinatorial circuit.

17. At least one non-transitory computer readable medium storing instructions that, when executed by one or more processors, cause the one or more processors to:

monitor at least one clock pin of at least one sequential element in a circuit design;

for a chain of nested clock gaters identified at an identified clock path, traverse the identified clock path to find at least one new clock gater on the identified clock path;

upon finding the new clock gater on the identified clock path, replace the new clock gater with an AND gate where a first input of the AND gate is an original enable signal and a second input of the AND gate is from a second AND gate that replaces a second clock gater;

cease traversing the identified clock path; and generate a combinatorial circuit.

* * * * *